United States Patent [19]

Kobori

[11] Patent Number: 5,216,069
[45] Date of Patent: Jun. 1, 1993

[54] SILICONE SELF-ADHESIVES COMPRISING MODIFIED ORGANOPOLYSILOXANES AND SELF-ADHESIVE TAPES

[75] Inventor: Takahide Kobori, Annaka, Japan

[73] Assignee: Shin-Etsu Chemical Co., Ltd., Tokyo, Japan

[21] Appl. No.: 632,608

[22] Filed: Dec. 27, 1990

Related U.S. Application Data

[63] Continuation of Ser. No. 231,263, Aug. 12, 1988, abandoned.

[30] Foreign Application Priority Data

Aug. 12, 1987 [JP] Japan ................... 62-201230

[51] Int. Cl.$^5$ ............... C08L 83/05; C08G 77/12
[52] U.S. Cl. ..................... 524/588; 524/862; 525/478; 528/15; 528/31; 528/32; 428/447
[58] Field of Search ............ 525/478, 477; 528/15, 528/31, 32, 33; 428/447; 524/588, 862

[56] References Cited

U.S. PATENT DOCUMENTS

| | | | |
|---|---|---|---|
| 2,736,721 | 2/1956 | Dexter | 528/17 |
| 2,814,601 | 11/1957 | Currie | 528/31 |
| 3,527,842 | 9/1970 | Clark | 525/478 |
| 3,528,940 | 9/1970 | Modic | 525/477 |
| 3,983,298 | 9/1976 | Hahn et al. | 428/355 |
| 4,774,297 | 9/1988 | Murakami | 525/478 |

FOREIGN PATENT DOCUMENTS

| | | |
|---|---|---|
| 50-10615 | 4/1975 | Japan . |
| 52-29831 | 3/1977 | Japan . |
| 60-011950 | 3/1985 | Japan . |

*Primary Examiner*—Ralph H. Dean, Jr.
*Attorney, Agent, or Firm*—Lowe, Price, LeBlanc & Becker

[57] ABSTRACT

A silicone self-adhesive comprising an organopolysiloxane obtained by partial condensation of from 40 to 80 parts by weight of a diorganopolysiloxane containing at least an alkenyl group and a aryl group and correspondingly from 60 to 20 parts by weight of a copolymer which consists essentially of $SiO_2$ units and $R'_3SiO_{0.5}$ units, in which each R' represents a monovalent hydrocarbon group having not larger than 3 carbon atoms, at a mixing ratio by mole of from 1:0.3 to 1:1.5 and which has at least one hydroxyl group directly bonded to a silicon atom in the molecule, and an organohydrogenpolysiloxane used in an amount sufficient to give from 1 to 30 Si-H bonds per one vinyl group of the above ingredient. A catalytically effective amount of a platinum catalyst is added to the above self-adhesive. An self-adhesive tape or sheet using the above self-adhesive is also provided.

10 Claims, No Drawings

SILICONE SELF-ADHESIVES COMPRISING MODIFIED ORGANOPOLYSILOXANES AND SELF-ADHESIVE TAPES

This application is a continuation; application of application Ser. No. 07/231,263, filed Aug. 12, 1988, now abandoned.

BACKGROUND OF THE INVENTION

1. Field of the Invention

This invention relates to adhesive and more particularly, to pressure-sensitive silicon adhesives or silicone self-adhesives which are applicable to various supports without use of any primer and are cured at relative low temperatures. The invention also relates to a silicone self-adhesive tape or sheet using the above self-adhesive.

2. Description of the Prior Art

Known pressure-sensitive silicone adhesives are those which are obtained by condensation of dimethylpolysiloxane of a high degree of polymerization blocked with a hydroxyl group at ends of the molecular chain with copolymers comprised of $SiO_2$ units and $(CH_3)_3SiO_{0.5}$ units. The self-adhesive tapes or sheets obtained by coating these pressure-sensitive adhesives on film supports exhibit not only good self-adhesiveness and cohesiveness, but also good heat resistance, low temperature characteristics, electric characteristics and water proofing which are inherently possessed by silicones. However, when the supports are made of organic fluorine-containing resins, polyimide resins, polyamide-imide resins, polyamide resins, polyester resins, polyther imide resins, polyether ether ketone resins and the like, difficulties are encountered in that the self-adhesive is liable to transfer to an adherend because of the poor adhesion or anchoring force of the adhesive to the support.

For the fabrication of such self-adhesive tapes or sheets, it is the common practice that the support is subjected to chemical treatment with a sodium amide or naphthalene solution or a potassium bichromate solution or mechanical etching on the surface. Nevertheless, the anchoring force is not adequate.

Japanese Patent Publication Nos. 50-10615 and 60-11950 and Japanese Laid-open Patent Application No. 52-29831 propose methods in which a silicone primer layer is first formed on a support, either chemically or mechanically treated or untreated, and then a silicone self-adhesive top coating is applied on the primer layer.

These methods can improve the anchoring force but involve an additional step of the primer coating prior to the application of the self-adhesive layer. Further, the problem involved in existing self-adhesive tapes or sheets is not solved. When the tape or sheet is cut at a desired portion or in a desired form, the self-adhesive becomes stringed at the cut portion or spreads to outside, thus causing the surface of an adherend to be soiled. This problem cannot be solved by application of the primer.

The silicone self-adhesives conveniently adhere to any adherend and is applicable to a body to which non-silicone self-adhesives are unlikely to adhere. Accordingly, the silicone self-adhesives have been applied to supports including not only heat-resistant plastic films, but also supports of a lower heat resistance such as Japanese paper, cotton cloth, and films of polyvinyl chloride, polyethylene, cellulose acetate, regenerated cellulose and the like. However, the silicone self-adhesives are usually used in combination with a benzoyl peroxide vulcanizing agent. For imparting well-balanced tackiness, self-adhesiveness, cohesiveness and anchoring force to the resultant self-adhesive layer, it is necessary to cure the self-adhesive at temperatures not lower than 150° C. The silicone self-adhesive tapes or sheets using supports of a low heat resistance cannot be baked at high temperatures, with lowerings of the cohesiveness and anchoring force. This leads to a difficulty in that the self-adhesive layer will transfer to the back surface of the tape or sheet or to the surface of an adherend, or cannot be readily cut in situ without involving any stringiness at the cut portion.

SUMMARY OF THE INVENTION

It is accordingly an object of the invention to provide a silicone self-adhesive which overcomes the difficulties involved in the prior art self-adhesives.

It is another object of the invention a silicone self-adhesive which, when applied as a self-adhesive tape or sheet, is substantially free of transfer of the self-adhesive layer to the back of the tape or the surface of an adherend.

It is a further object of the invention to provide a silicone self-adhesive tape or sheet which comprises a layer of a vulcanized silicone self-adhesive whereby the self-adhesive layer is ready to neatly cut at portions of the tape where cut.

The silicone self-adhesive of the invention comprises:

(a) an organopolysiloxane obtained by partial condensation of from 40 to 80 parts by weight of a diorganopolysiloxane of the following general formula (A)

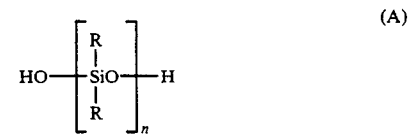

in which each R represents an unsubstituted or substituted monovalent hydrocarbon group provided that based on all the hydrocarbon groups represented by Rs, the content of an alkenyl group is in the range of from 0.01 to 10 mole % and the content of an aryl group is in the range of from 3 to 20 mole %, and n is an integer of from 100 to 10,000, and correspondingly from 60 to 20 parts by weight of a copolymer which consists essentially of $SiO_2$ units and $R'_3SiO_{0.5}$ units, in which each R' represents a monovalent hydrocarbon group having not larger than 3 carbon atoms, at a mixing ratio by mole of from 1:0.3 to 1:1.5 and which has at least one hydroxyl group directly bonded to a silicon atom in the molecule;

(b) an organohydrogenpolysiloxane used in an amount sufficient to give from 1 to 30 Si-H bonds per one alkenyl group of the above ingredient (a); and (c) a catalytically effective amount of a platinum catalyst.

The self-adhesive tape or sheet which is comprised of a support and a layer obtained by curing the silicone self-adhesive defined above is also provided in accordance with the present invention.

When cured, the silicone self-adhesive has inherently good self-adhesiveness, heat resistance, low temperature characteristics, electric characteristics and water-proofing, and are also superior to known silicone self-adhesives in the following respects. Because of the good anchoring force, self-adhesive tapes can be obtained without use of any primer. This is advantageous in that when the tape is used after long-term storage in a condition where the tape is firmly rolled, the self-adhesive layer does not transfer to the back of the support. Also, the self-adhesive layer does not transfer or migrate the surface of an adherend. The self-adhesive layer has good cutting ability, so that when the self-adhesive tape or sheet is cut in a desired form, the self-adhesive layer does not stretch or spread or turn over but cut neatly along the cut portion of the support. Thus, the tape ensures good workability without soiling of an adherend or the self-adhesive tape or sheet itself. In addition, the silicone self-adhesive can be cured at relatively low temperatures, it may be applied to supports which are less resistant to heat.

DETAILED DESCRIPTION AND EMBODIMENTS OF THE INVENTION

The silicone self-adhesive according to the invention is comprised of the ingredients (a) to (c) defined before.

The ingredient (a) is a partial condensation product which is obtained by mixing and heating from 40 to 80 parts by weight of the diorganopolysiloxane represented by the general formula (A) and correspondingly from 60 to 20 parts by weight of a copolymer consisting essentially of $SiO_2$ units and $R'_3SiO_{0.5}$ units wherein each R' has the same meaning as defined before. In the formula (A), each R represents an unsubstituted or substituted monovalent hydrocarbon group including a lower alkyl group having from 1 to 4 carbon atoms such as a methyl group, an ethyl group, a propyl group or the like, an alkenyl group having from 2 to 4 carbon atoms such as a vinyl group, an allyl group or the like, and an aryl group such as a phenyl group, a tolyl group or a xylyl group. These groups may be partially substituted, at the hydrogen atoms bonded to the carbon atoms of the hydrocarbon groups, with a halogen atom such as Cl, I, Br or the like, a cyano group or the like.

In the formula (A), n, which indicates a degree of polymerization, is an integer of from 100 to 10,000, preferably from 1,000 to 8,000. This degree of polymerization is necessary so that the cured layer obtained from the organopolysiloxane self-adhesive composition comprised of the ingredients (a) to (c) exhibits high cohesiveness and good self-adhesiveness.

The ingredient (a) should form a cured layer having good cohesiveness and self-adhesiveness by addition reaction with the organohydrogenpolysiloxane of the ingredient (b) in the presence of a platinum catalyst used a the ingredient (c). To this end, the diorganopolysiloxane of the formula (A) should have from 0.01 to 10 mole %, preferably from 0.1 to 5 mole %, of an alkenyl group based on the total groups bonded to the silicon atoms of the diorganopolysiloxane. If the content of the alkenyl group is smaller, the degree of crosslinking becomes so small that the resultant cured self-adhesive layer has not good cohesiveness. On the contrary, when the content is larger, the degree of crosslinking becomes so high that the resultant layer becomes hard with poor self-adhesiveness.

In order to impart a high anchoring force and a good cutting ability to the cured self-adhesive layer, 3 to 20 mole % of the total groups of the polysiloxane of the formula (A) should be an aryl group If the aryl group is not present or is contained only in very smaller amounts, anchoring on a support is not satisfactory. The resultant self-adhesive layer will transfer to the back of the support or the surface of an adherend. Alternatively, the self-adhesive layer may be removed from the support or may spread from a cut portion because of the poor cutting ability or characteristic. This is unfavorable from the standpoint of practical applications of the tape. If the content of the aryl group is higher, the miscibility of the ingredients (a) and (b) becomes poor. The resultant self-adhesive is illbalanced in characteristics including tackiness, self-adhesiveness, cohesiveness and anchoring force. Most preferably, the content is in the range of from 5 to 15 mole %.

The diorganopolysiloxane may be constituted of not only one diorganosiloxane unit, but also a mixture of two or more diorganosiloxane units.

The copolymer consisting of $SiO_2$ units and $R'_3SiO_{0.5}$ which is partially condensed with the diorganopolysiloxane of the formula (A) is well known in the art. This copolymer is readily obtained by co-hydrolysis and condensation of, for example, water glass (sodium silicate) or ortho-alkyl silicates or partial hydrolyzates thereof used as $SiO_2$ units and at least one silane or siloxane used as $R'_3SiO_{0.5}$ units in the presence of an acid. Examples of such a silane or siloxane includes trimethylchlorosilane, trimethylmethoxysilane, triethylchlorosilane, dimethylpropylchlorosilane, dimethylpropylmethoxysilane, dimethylvinylchlorosilane, dimethylvinylemthoxysilane, hexamethyldisiloxane and mixtures thereof. When the content of the $SiO_2$ units in the copolymer are too large, the miscibility with the diorganopolysiloxane of the formula (A) becomes poor, making the partial condensation difficult. The good anchoring effect and cutting ability cannot be obtained. On the contrary, when the content of the $SiO_2$ units is too small, it is difficult to obtain a cured self-adhesive layer having good cohesiveness. For imparting well-balanced self-adhesiveness, cohesiveness and anchoring force to the self-adhesive layer along with good cutting ability, the molar ratio of the $SiO_2$ units and the $R'_3SiO_{0.5}$ units is in the range of from 1:0.3 to 1:1.5, preferably from 1:0.5 to 1:1.3. In addition, it is essential that at least one hydroxyl group directly bonded to the silicon atom be present in the molecule.

When the amount of the diorganopolysiloxane is excessive for the partial condensation reaction with the copolymer, the resultant self-adhesive layer has not good tackiness and self-adhesiveness. On the contrary, when the amount is too small, good cohesiveness, anchoring force and cutting ability cannot be imparted to the self-adhesive layer. Accordingly, it is necessary to use 40 to 80 parts by weight of the diorganopolysiloxane and correspondingly from 60 to 20 parts by weight of the copolymer for the partial condensation reaction. The partial condensation reaction is usually effected in a solvnet such as toluene at a temperature of from 50° to 150° C. for 5 to 40 hours.

The organohydrogenpolysiloxane used as the ingredient (b) is used for crosslinking reaction with the ingredient (a). Examples of the organohydrogenpolysiloxane are, for example, those polysiloxanes of the following formulae:

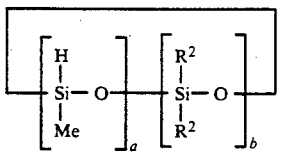

in which each $R^2$ represents a monovalent hydrocarbon group, Me represents a methyl group, $a=2$ to 4, and $b=0$ to 4 provided that $a+b=3$ to 8;

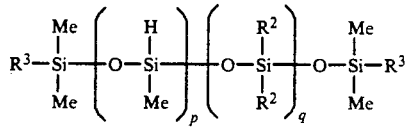

in which each $R^2$ and each Me have, respectively, the same meanings as defined above, $R^3$ represents a hydrogen atom or a monovalent hydrocarbon group, $p=0$ to 3000 and $q=0$ to 3000 provided that at least two hydrogen atoms bonded to the silicon atoms are present in one molecule;

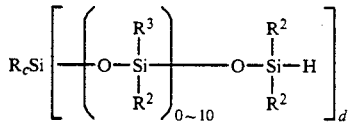

in which $R^2$ and $R^3$ have, respectively, the same meanings as defined above, $c=1$ or 2 and $d=2$ or 3 provided that $c+d=4$.

Moreover, organohydrogenpolysiloxanes consisting of $R^2SiO_{1.5}$ units and $R^2HSiO$ units with or without $R^2_2SiO$ units may also be used, in which each $R^2$ has the same meaning as defined above.

In the above formulae, the monovalent hydrocarbon group represented by $R^2$ and $R^3$ may be those defined with respect to the formula (A).

The ingredient (c) is platinum or a platinum compound which may be any platinum compound known as a catalyst for the addition reaction between vinyl group-containing organopolysiloxanes and organohydrogenpolysiloxanes. Examples of such catalysts include chloroplatinic acid, alcohol-modified chloroplatinic acid, complexes of chloroplatinic acid and olefins, platinum black, and the like. Alternatively, solid platinum supported on a carrier such as alumina, silica or the like may be used.

The organopolysiloxane composition comprised of the ingredients (a) to (c) according to the invention is directly applied onto a tape or sheet support to form a silicone self-adhesive layer.

For the application of the organopolysilicone composition, it may be diluted with a solvent so as to allow easy application. Moreover, finely powdered silica fillers may be added for reinforcing the self-adhesive layer. To this end, silicone wetting agents or surface active agents may be added in small amounts sufficient to facilitate the mixing of the filler with the essential ingredients. For coloration, inorganic organic pigments or dyes may be added to the composition. These additives should be added in amounts not impeding the inherent characteristics of the essential ingredients. Also, known retarders may be added so as to suppress the addition reaction of the composition, if necessary.

The tape or sheet support may be those of organic fluorine-containing polymers such as polytetrafluoroethylene, polyimides, polyamides, polyamideimides, polyesters, polyether ether ketones, polyether imides, polyethylene and the like, or glass cloth, cotton cloth, Japanese paper, metallic foils, and the like.

The silicone self-adhesive of the invention can be applied onto a tape or sheet support by any suitable means without application of any undercoating on the tape or sheet support. The dry thickness of the organopolysiloxane composition comprised of the ingredients (a) to (c) may be in the range of from 0.01 to 0.1 mm. The silicone self-adhesive applied onto a support is vulcanized or cured by allowing it to stand at room temperature for 2 hours or longer to obtain intended characteristics. For developing the intended characteristics within a shorter time from the industrial standpoint, the curing is facilitated by heating, for example, at 70° to 130° C. for 1 to 20 minutes. These heating conditions are mild and sufficient not to cause a support, which is poor in heat resistance, to deteriorate.

Known silicone self-adhesive tapes or sheets are, more or less, influenced by atmospheric temperature and humidity when stored over a long term and undergo unfavorable phenomena of "layer separation" or "blister". Accordingly, the known tapes or sheet cannot be stored over a long term with an attendant problem that the storage control is very difficult. In contrast, the self-adhesive tapes or sheets obtained by the present invention are substantially free of the problems encountered in the known tapes or sheets since the organopolysiloxane composition has good adhesion to supports of various types of materials. When the self-adhesive tape is peeled off after adhesion to various types of materials over a long term, no migration of the self-adhesive layer on the surface of the material is recognized. Additionally, the silicone self-adhesive exhibits a high adhesion force at low temperature.

The present invention is more particularly described by way of examples, in which parts are by weight. In the examples, self-adhesive samples were measured in the following manner with respect to their characteristics including tackiness, self-adhesiveness, cohesiveness, migration, cutting ability and retention. Tackiness: determined by a ball-on-slope tackiness measuring method in which a self-adhesive tape was fixed on a sloping surface with an angle of inclination of 30° so that a self-adhesive layer was turned outside, and a steel ball (SUJ2 prescribed in JIS G 4805) was rolled down the slope with an approach run of 10 cm. The tackiness was expressed as a maximum diameter by inch of a steel ball which stopped within 10 cm of the self-adhesive layer. The measurement was effected under conditions of a temperature of 25° C.±2° C. and a relative humidity of 65±5%.

Self-adhesiveness: a self-adhesive layer of a test piece was lightly adhered to a center of a SUS 27 CP stainless steel sheet having a thickness of 1.0 mm, a width of 30 mm and a length of 160 mm, followed by pressing the test piece by reciprocating once a metallic roller having an about 6 mm thick rubber covering layer with a weight of 2,000±50 g at a speed of about 300 mm/minute. After completion of the pressing, the test piece was allowed to stand in a theremostatic chamber of 25°±2° C. and 65±5% R.H. for 30 minutes or over. A free end portion of the test piece was folded back at 180° and was continuously peeled off at a speed of 300 mm/minute to obtain a peeling force. This peeling force was determined as self-adhesiveness.

Cohesiveness: A test piece was adhered to a stainless steel sheet in an area of 20 mm in length and 100 mm in width, followed by loading with a weight of 1 kg and allowing to stand under conditions of 25°±2° C. and 65±5% R.H., thereby determining a shearing length as the cohesiveness.

Migration of a self-adhesive layer on the back surface of a self-adhesive tape: a self-adhesive tape rolled on a bobbin was allowed to stand under conditions of 50° C. and 90% R.H. for 7 days and was rapidly rewound at a speed of 50 to 100 m/minute to visually observe whether or not the self-adhesive layer was migrated on the back side of the tape or blister of the self-adhesive tape occurred. Cutting ability: only a support of a self-adhesive tape or sheet was cut with a length of about 2 mm from one side of the support, after which the tape was horizontally pulled to breakage. Visual observation was made as to whether or not the self-adhesive layer was partially separated and turned over or became stringed.

Retention: a test piece was adhered to a stainless steel sheet in an area of 20 mm in length and 10 mm in width and loaded with a weight of 500 g, followed by suspending in a thermostatic dryer at 100° C. to determine a time before the weight dropped.

REFERENCE

Coating solutions I to VI were prepared in the following manner.

Coating solution I: 40 parts of a methylpolysiloxane resin consisting of 0.7 moles of $Me_3SiO_{0.5}$ units and 1 mole of $SiO_2$ units and 60 parts of crude rubber-like diorganopolysiloxane which consisted of $Me_2SiO$ units, $(C_6H_5)_2SiO$ units and $(CH_2=CH)MeSiO$ units, was blocked with a hydroxyl group at ends thereof and had a degree of polymerization of 8,000 and in which the contents of the vinyl group and the phenyl group in the total organic groups were, respectively, 3 mole %, were mixed in toluene. The mixture was subjected to partial condensation reaction at a temperature of from 100° to 120° C. for 4 hours to obtain a toluene solution of 60% organopolysiloxane. To the toluene solution was added 2 wt % of methylhydrogenpolysiloxane of the following formula

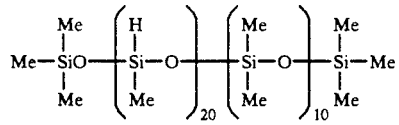

Chloroplatinic acid was further added to the mixture in an amount of 15 ppm calculated as platinum to obtain coating solution I.

Coating solution II: 50 parts of a methylpolysiloxane resin consisting of 1.3 moles of $Me_3SiO_{0.5}$ units and 1 mole of $SiO_2$ units and 50 parts of crude rubber-like diorganopolysiloxane which consisted of $Me_2SiO$ units, $Me(C_6H_5)SiO$ units and $(CH_2=CH)MeSiO$ units, was blocked with a hydroxyl group at ends thereof and had a degree of polymerization of 2,000 and in which the contents of the vinyl group and the phenyl group in the total organic groups were, respectively, 0.1 mole % and 10 mole %, were mixed in toluene. The mixture was subjected to partial condensation reaction at a temperature of from 100° to 120° C. for about 6 hours to obtain a toluene solution of 60% organopolysiloxane. To 100 parts of the toluene solution was added 4 parts of methylhydrogenpolysiloxane of the following formula

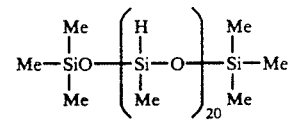

Chloroplatinic acid was further added to the mixture in an amount of 20 ppm calculated as platinum, to which toluene was added for dilution to 30 wt % of non-volatile matters to obtain coating solution II.

Coating solution III: 50 parts of a methylpolysiloxane resin consisting of 0.9 moles of $Me_3SiO_{0.5}$ units and 1 mole of $SiO_2$ units and 50 parts of crude rubber-like diorganopolysiloxane which consisted of $Me_2SiO$ units, $(C_6H_5)_2SiO$ units and $(CH_2=CH)MeSiO$ units, was blocked with a hydroxyl group at ends thereof and had a degree of polymerization of 5,000 and in which the contents of the vinyl group and the phenyl group in the total organic groups were, respectively, 1 mole % and 5 mole %, were mixed in toluene. The mixture was subjected to partial condensation reaction at a temperature of about 100° C. for 16 hours to obtain a toluene solution of 60% organopolysiloxane. To 100 parts of the toluene solution were added 6 parts of organohydrogenpolysiloxane which consisted of $Me_2HSiO_{0.5}$ units, $MeHSiO$ units, $C_6H_5SiO_{1.5}$ units and $Me_2SiO$ units, and had an average degree of polymerization of 40, a content of hydrogen atoms, directly bonded to silicon atoms, of 25 mole %, and a content of the phenyl groups of 2 mole % in the total organic group. Chloroplatinic acid was added to the mixture in an amount of 30 ppm to obtain coating solution III.

Coating solution IV: 1.2 parts of benzoyl peroxide and 50 parts of toluene were added to a silicone self-adhesive KR101-10 (commercial name of Shinetesu Chem. Ind. Co., Ltd.) to obtain coating solution IV.

Coating solution V: 40 parts of a methylpolysiloxane resin consisting of 0.7 moles of $Me_3SiO_{0.5}$ units and 1 mole of $SiO_2$ units and 60 parts of crude rubber-like diorganopolysiloxane which consisted of $Me_2SiO$ units, $(C_6H_5)_2SiO$ units and $(CH_2=CH)MeSiO$ units, was blocked with a hydroxyl group at ends thereof and had a degree of polymerization of 8,000 and in which the contents of the vinyl group and the phenyl group in the total organic groups were, respectively, 3 mole % and 1.5 mole %, were mixed in toluene. The mixture was subjected to partial condensation reaction at a temperature of from 100° to 120° C. for 4 hours to obtain a toluene solution of 60% organopolysiloxane. To the toluene solution was added 2 wt % of methylhydrogenpolysiloxane of the following formula

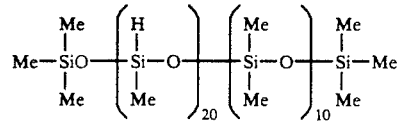

Chloroplatinic acid was further added to the mixture in an amount of 15 ppm calculated as platinum to obtain coating solution V.

Coating solution VI: same as the coating solution II except that the platinum catalyst was not added, thereby obtaining coating solution VI.

EXAMPLE 1

The coating solution I was directly applied onto supports including a 0.08 mm thick polytetrafluoroethylene tape treated with sodium amide on one side, a polyester film, a polyimide tape and a Japanese paper sheet, followed by heating at 120° C. for 5 minutes to obtain self-adhesive tapes each having a 0.04 mm thick self-adhesive layer.

For comparison, the coating solution IV was applied to similar supports and heated at 120° C. for 5 minutes to obtain self-adhesive tapes each having a 0.04 mm thick self-adhesive layer (Comparative Example 1).

The respective tapes were subjected to the measurements of the characteristics described before. The results are shown in Table 1 below. From the results, it will be seen that the self-adhesive tapes obtained according to the invention exhibit good cutting characteristic and involve no migration of the self-adhesive layer on the back surface of the tapes and an adherend although no primer coating was used. Thus, the tapes of the invention are significantly better than the tapes for comparison with respect to workability and performance.

TABLE 1

|  | Ex. 1 | Comp. Ex. 1 |
|---|---|---|
| Type of Coating Solution | I | IV |
| Thickness of self-adhesive layer (mm) | 0.04 | 0.04 |
| Ball tackiness (No.) | | |
| 25° C. | 32< | 32< |
| 0° C. | 32 | 28 |
| Self-adhesiveness (g/19 mm) | 650 | 600 |
| Cohesiveness (shearing length in mm) | 0.10 | 0.60 |
| Cutting characteristic | | |
| Support: | | |
| polytetrafluoroethylene | ○ | x |
| polyester | ○ | x |
| polyimide | ○ | x |
| Japanese paper | ○ | x |
| Migration of self-adhesive layer on the back of tape (after 7 days under conditions of 50° C. × 90% R.H.) | | |
| Support: | | |
| polytetrafluoroethylene | ○ | x |
| polyester | ○ | x |
| polyimide | ○ | x |
| Japanese paper | ○ | x |
| Migration of self-adhesive layer on the surface of adherend (after 7 days under conditions of 50° C. × 90% R.H.) | | |
| Adherend: | | |
| silicone rubber | ○ | x |
| neoprene | ○ | x |
| ABS resin sheet | ○ | x |
| acrylic resin sheet | ○ | x |
| glass sheet | ○ | x |
| stainless steel sheet | ○ | x |

Note:
The marks "○", "Δ" and "x" in the Cutting Ability and Migration mean that:
"○" no migration, or no stretching or turnover of a self-adhesive layer with respect to the cutting characteristic.
"x" whole migration, or a greater degree of stretching or turnover of a self-adhesive layer with respect to the cutting ability.
"Δ" partial migration, or a small degree of stretching or turnover of a self-adhesive layer with respect to the cutting ability.

EXAMPLE 2

The coating solution II prepared in Reference was directly applied onto each of tape supports of the materials indicated in Table 2 and dried and cured at 130° C. for 3 minutes to obtain self-adhesive tapes. These tapes were subjected to measurements of the characteristics described before. For comparison, the coating solution V was used and applied in the same manner as described above and heated at 180° C. for 2 minutes to obtain self-adhesive tapes (Comparative Example 2).

The thickness of the self-adhesive layer of all the self-adhesive tapes was controlled in 0.4 mm. The results are shown in Table 2 below.

TABLE 2

|  | Ex. 2 | Comp. Ex. 2 |
|---|---|---|
| Type of Coating Solution | II | V |
| Thickness of self-adhesive layer (mm) | 0.04 | 0.04 |
| Ball tackiness (No.) | | |
| 25° C. | 32< | 32< |
| 0° C. | 32 | 28 |
| −30° C. | 8 | 2 |
| Self-adhesiveness (g/19 mm) | | |
| 25° C. | 700 | 630 |
| −30° C. | 950 | 880 |
| Cohesiveness (shearing length in mm) 25° C. | 0.12 | 0.20 |
| Retention (Hrs.) 100° C. | 24< | 0.5> |
| Cutting ability | | |
| Support: | | |
| polytetrafluoroethylene | ○ | x |
| polyester | ○ | Δ |
| polyimide | ○ | x |
| Japanese paper | ○ | x |
| Migration of self-adhesive layer on the back of tape (after 7 days under conditions of 50° C. × 90% R.H.) | | |
| Support: | | |
| polytetrafluoroethylene | ○ | x |
| polyester | ○ | Δ |
| polyimide | ○ | x |
| non-woven fabric of cellulose acetate | ○ | x |
| Migration of self-adhesive layer on the surface of adherend (after 7 days under conditions of 50° C. × 90% R.H.) | | |
| Adherend: | | |
| silicone rubber | ○ | x |
| neoprene | ○ | x |
| acrylic resin sheet | ○ | x |
| Migration of self-adhesive layer on the surface of adherend (after 5 days under conditions of 200° C.) | | |
| Adherend: | | |
| silicone rubber | ○ | x |
| glass sheet | ○ | x |
| stainless sheet | ○ | x |

EXAMPLE 3

The coating solution prepared in Reference was directly applied onto tape supports indicated in Table 3 and thermally curing at 100° C. for 5 minutes to obtain self-adhesive tapes. These tapes were subjected to measurements of the characteristics described before. For comparison, the coating solution VI was used to make self-adhesive tapes in the same manner as mentioned above (Comparative Example 3). The self-adhesive layer of all the tapes was in a thickness of 0.04 mm. The results are shown in Table 3.

As will be apparent from Tables 2 and 3, the self-adhesive tapes are better in low and high temperature self-adhesive characteristics and exhibit a very good cutting characteristic. In addition, no migration of the self-adhesive layer on the back of the tape and the surface of the adherends.

TABLE 3

|  | Ex. 3 | Comp. Ex. 3 |
|---|---|---|
| Type of Coating Solution | III | VI |
| Thickness of self-adhesive layer (mm) | 0.04 | 0.04 |
| Ball tackiness (No.) | | |
| 25° C. | 32< | 32< |
| 0° C. | 32 | 32 |
| Self-adhesiveness (g/19 mm) 25° C. | 750 | 680 |
| after aging under conditions of 150° C. for 7 days | | |
| Cohesiveness (shearing length in mm) | | |
| 1 kg/20 mm × 10 mm, 25° C. × 30 min. | 0.12 | 2.0 |
| 500 g/25 mm × 25 mm, 260° C. × 60 min. | 0.23 | dropped |
| Cutting ability | | |
| Support: | | |
| polytetrafluoroethylene | ○ | x |
| polyester | ○ | x |
| polyimide | ○ | x |
| Japanese paper | ○ | x |
| Migration of self-adhesive layer on the back of tape (after 7 days under conditions of 50° C. × 90% R.H.) | | |
| Support: | | |
| polytetrafluoroethylene | ○ | x |
| polyester | ○ | Δ |
| polyimide | ○ | x |
| non-woven fabric of cellulose acetate | ○ | x |
| Migration of self-adhesive layer on the surface of adherend (after 7 days under conditions of 50° C. × 90% R.H.) | | |
| Adherend: | | |
| silicone rubber | ○ | x |
| RTV silicone rubber | ○ | x |
| (230° C. × 3 hours after adhesion) | | |
| Adherend: | | |
| silicon rubber | ○ | x |
| stainless sheet | ○ | x |

What is claimed is:

1. A silicone self-adhesive comprising:
   (a) an organopolysiloxane obtained by partial condensation of from 40 to 80 parts by weight of a diorganopolysiloxane of the following general formula

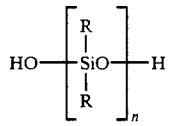

in which each R represents an unsubstituted or substituted monovalent hydrocarbon group provided that among all the hydrocarbon groups represented by R, the content of an alkenyl group is in the range of from 0.01 to 10 mole % and the content of an aryl group is in the range of from 3 to 20 mole %, and n is an integer of from 100 to 10,000, and correspondingly from 60 to 20 parts by weight of a copolymer which consists essentially of $SiO_2$ units and $R'_3SiO_{0.5}$ units, in which each R' represents a monovalent hydrocarbon group having not larger than 3 carbon atoms, said $SiO_2$ units and $R'_3SiO_{0.5}$ units being present at a mixing ratio by mole defined as $SiO_2$ to $R'_3SiO_{0.5}$ of from 1:0.3 to 1:1.5 and which has at least one hydroxyl group directly bonded to a silicon atom in the molecule;
   (b) an organohydrogenpolysiloxane used in an amount sufficient to give from 1 to 30 Si-H bonds per one alkenyl group of the above ingredient (a); and
   (c) a catalytically effective amount of a platinum catalyst.

2. A silicone self-adhesive according to claim 1, wherein said alkenyl group is a vinyl group and said aryl group is a phenyl group.

3. A silicone self-adhesive according to claim 1, wherein the content of said alkenyl group is in the range of from 0.1 to 5 mole % and the content of said aryl group is in the range from 5 to 15 mole %.

4. A silicone self-adhesive according to claim 1, wherein n is an integer of from 1,000 to 8,000.

5. A silicone self-adhesive according to claim 1, wherein the mixing ratio of said $SiO_2$ units and $R'_3SiO_{0.5}$ units by mole defined as $SiO_2$ to $R'_3SiO_{0.5}$ is in the range of from 1:0.5 to 1:1.3.

6. A silicone self-adhesive according to claim 1, wherein the ingredient (b) is an organohydrogenpolysiloxane selected from

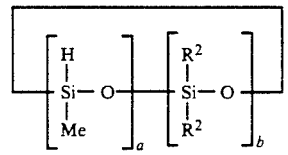

in which each $R^2$ represents a monovalent hydrocarbon group, Me represents a methyl group, a=2 to 4, and b=0 to 4 provided that a+b=3 to 8;

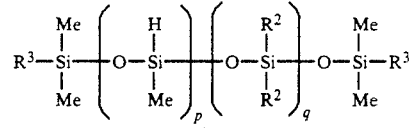

in which each $R^2$ and each Me have, respectively, the same meanings as defined above, $R^3$ represents a hydrogen atom or a monovalent hydrocarbon group, p=0 to 3000 and q=0 to 3000 provided that at least two hydrogen atoms bonded to the silicon atoms are present in one molecule; or

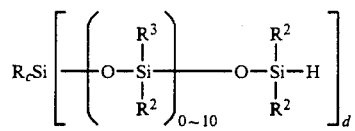

in which $R^2$ and $R^3$ have, respectively, the same meanings as defined above, c=1 or 2 and d=2 or 3 provided that c+d=4; or
an organohydrogenpolysiloxane consisting of $R^2SiO_{1.5}$ units and $R^2HSiO$ units with or without $R^2_2SiO$ units, in which each $R^2$ has the same meaning as defined above.

7. A self-adhesive sheet comprising, on a support, cured layer of the self-adhesive of claim 1.

8. A self-adhesive sheet according to claim 7, wherein said layer has a thickness of from 0.01 to 0.1 mm.

9. A self-adhesive sheet according to claim 7, wherein said support is selected from the group consisting of fluorine-containing polymers, cloths, papers and metals.

10. A silicone self-adhesive according to claim 1, further comprising a silica filler component.

* * * * *